June 12, 1956  L. KUN, JR., ET AL  2,750,485
ELECTRODE HOLDER AND EYE SHIELD COMBINATION
FOR ELECTRIC WELDING
Filed March 11, 1952  3 Sheets-Sheet 1

INVENTORS
LOUIS KUN, JR.
LOUIS KUN, SR.
ZOLTAN DAN,

BY
McMorrow, Berman & Davidson
ATTORNEYS

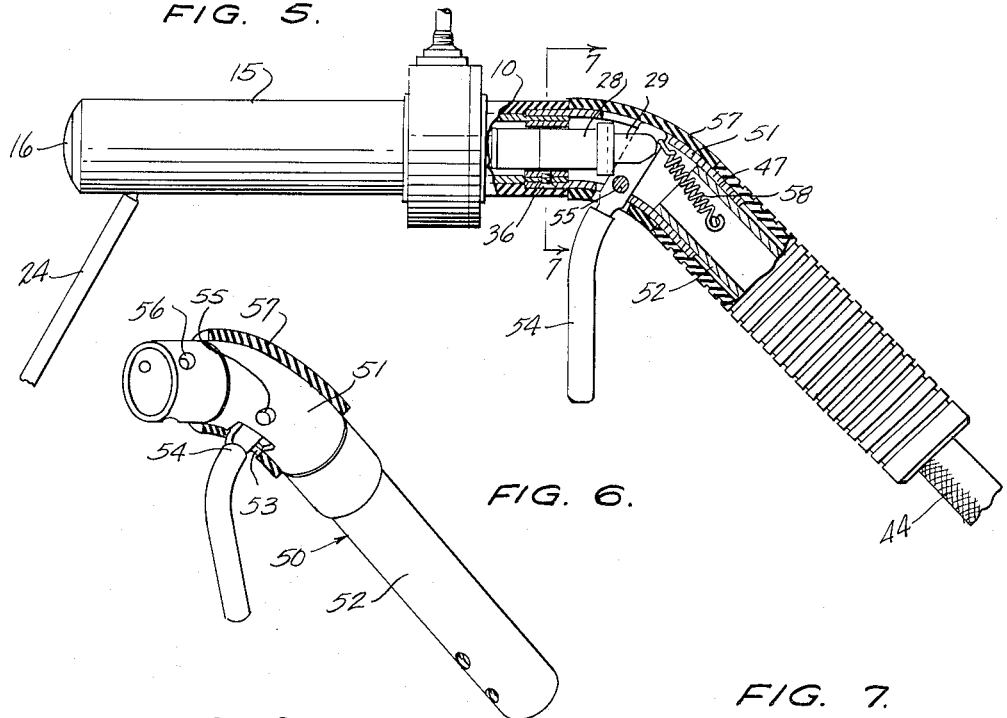
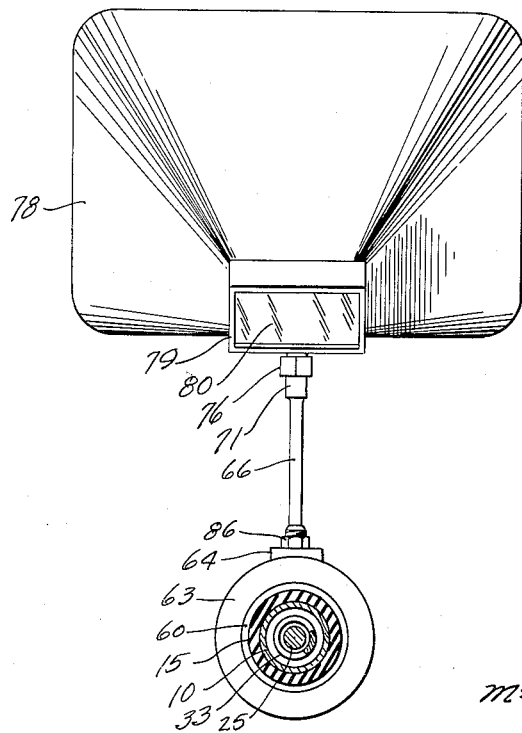
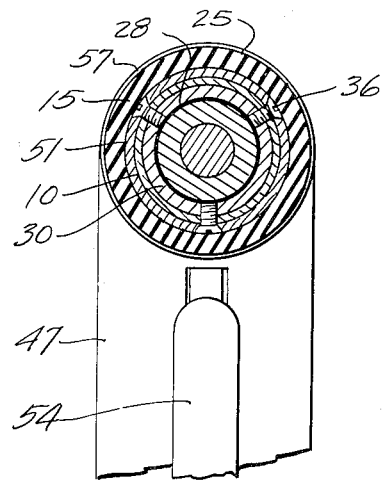

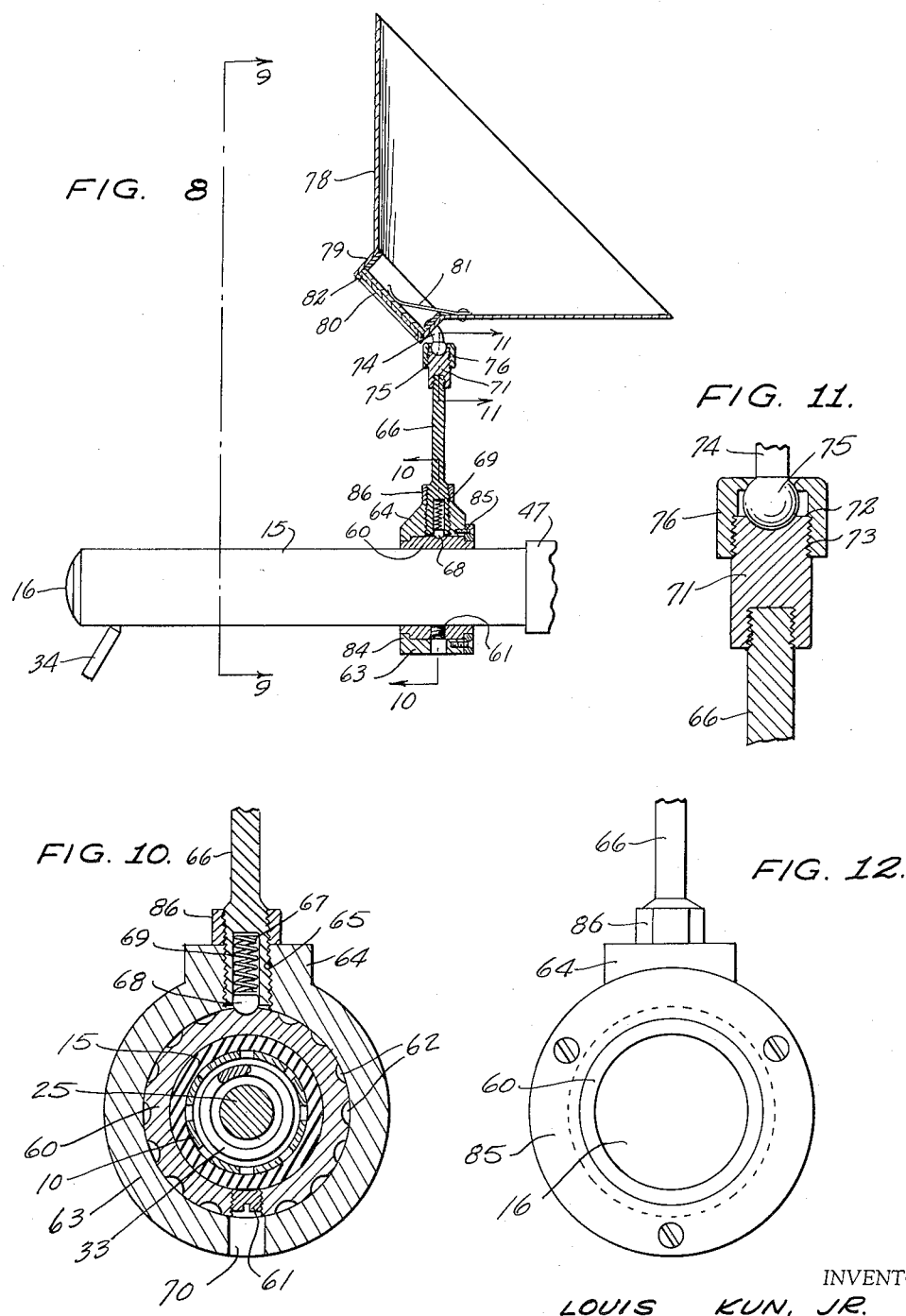

United States Patent Office 2,750,485
Patented June 12, 1956

2,750,485
ELECTRODE HOLDER AND EYE SHIELD COMBINATION FOR ELECTRIC WELDING

Louis Kun, Jr., Louis Kun, Sr., and Zoltan Dan, Lorain, Ohio

Application March 11, 1952, Serial No. 275,902

3 Claims. (Cl. 219—8)

This invention relates to electrode holders and eye shields for electric welding and more particularly to an electrode holder and eye shield combination wherein the eye shield is mounted directly on the electrode holder.

It is among the objects of the invention to provide an improved electrode holder and eye shield combination for electric welding which includes an electrode holder of improved design and an eye shield mounted directly on the electrode holder for angular adjustment in different directions relative to the holder; which combination is so balanced that the eye shield is easily maintained in upright position; which includes an electric holder that can be easily changed from a straight condition to an angularly offset condition in which the handle is disposed at an angle to the barrel of the holder, and easily returned to its straight condition as may be necessary or convenient for different operating conditions; which is completely insulated and safe to use; which firmly engages the electrodes or welding rods and provides for quick and easy replacement of the rods; and which is simple and durable in construction, economical to manufacture, easy to use, and neat and attractive in appearance.

Other objects and advantages will become apparent from a consideration of the following description and the appended claims in conjunction with the accompanying drawings wherein:

Figure 5 is a side elevational view of the electrode holder in angularly offset condition with its handle disposed at an angle to its barrel;

Figure 6 is a perspective view of a replacement element for converting the holder from its straight to its angularly offset condition;

Figure 7 is a transverse cross sectional view on an enlarged scale on the line 7—7 of Figure 5;

Figure 8 is a side elevational view of a fragmentary portion of a holder with an eye shield illustrative of the invention operatively mounted on the holder and shown in longitudinal medial cross sectional view;

Figure 9 is a cross sectional view on the line 9—9 of Figure 8;

Figure 10 is a transverse cross sectional view on an enlarged scale on the line 10—10 of Figure 8;

Figure 11 is a fragmentary cross sectional view on an enlarged scale on the line 11—11 of Figure 8; and Figure 12 is a front end elevational view of the electrode holder and eye shield support.

Figure 1:
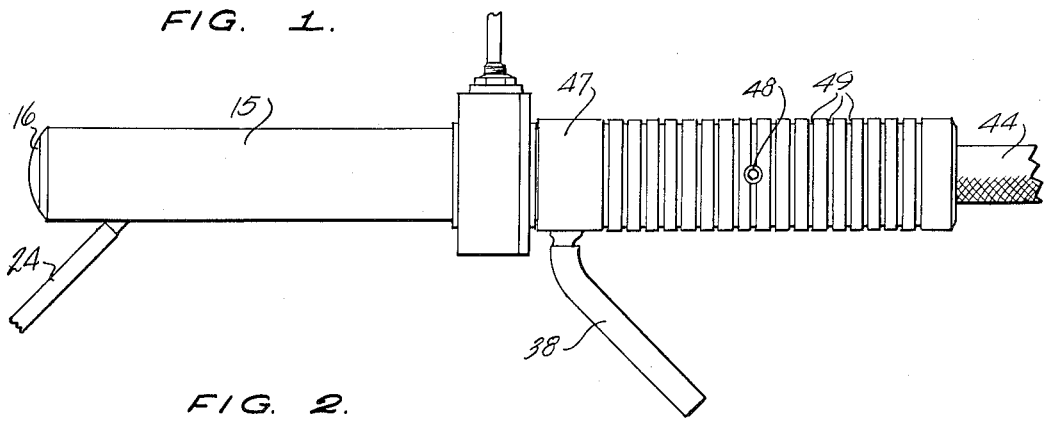
Figure 1 is a side elevational view of an electrode holder illustrative of the invention, the holder being shown in straight condition.
Figure 2:
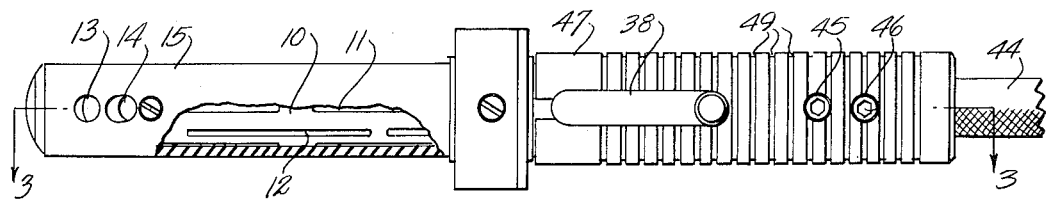
Figure 2 is a top plan view of the holder illustrated in Figure 1 with a portion broken away and shown in cross section to better illustrate the construction thereof.
Figure 3:
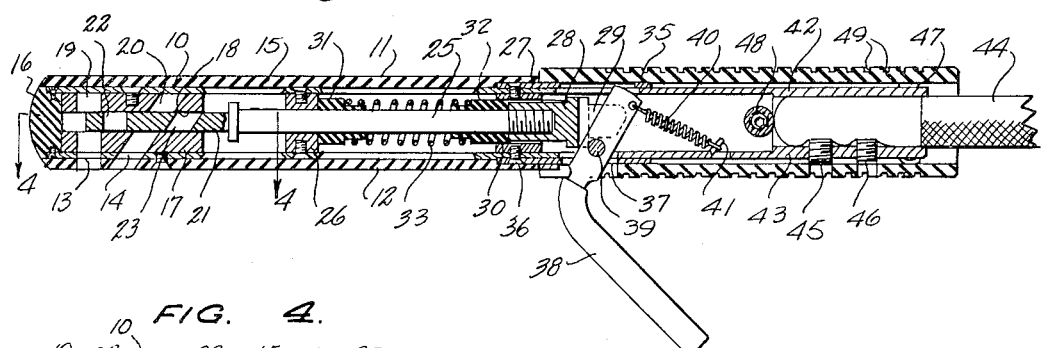
Figure 3 is a longitudinal cross sectional view on the line 3—3 of Figure 2.
Figure 4:
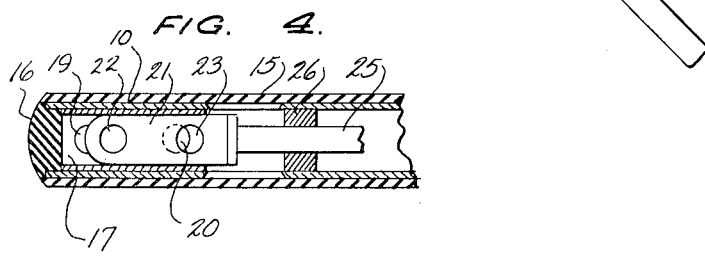
Figure 4 is a fragmentary cross sectional view on the line 4—4 of Figure 3.

With continued reference to the drawings, the electrode holder, as illustrated in Figures 1 to 4 inclusive, comprises a barrel 10 of cylindrical shape having both ends open and formed of a suitable electrically conductive material, such as copper. This barrel has diametrically opposite slots 11 and 12 extending longitudinally thereof intermediate its ends and apertures 13 and 14 in the wall arranged in longitudinal spaced relation adjacent one end thereof. The aperture 13 extends transversely through the barrel wall and the aperture 14 is inclined relative to the longitudinal center line of the barrel. A barrel insulating sleeve 15 of electrically insulative material such as hard rubber or synthetic resin plastic receives the barrel tube 10 and extends from one end to the other end of the latter. A plug 16 of electrically insulative material is secured in one end of the insulating sleeve 15 and closes the corresponding end of the barrel tube 10 and a guide block 17 is fixedly mounted in the barrel adjacent the plug 16 and has a bore 18 of rectangular cross sectional shape extending longitudinally thereof and apertures 19 and 20 extending transversely thereof and through the bore 18, the aperture 20 being inclined relative to the longitudinal center line of the guide block. A slide block 21 is slidably mounted in the bore 18 of the guide block 17 and is provided with apertures 22 and 23 which are registrable with the apertures 19 and 20 respectively in the guide block 17 and with the corresponding apertures 13 and 14 in the barrel 10 and insulating sleeve 15 to receive end portions of welding rods or electrodes, as indicated at 24.

When an end portion of a welding rod is received in the aperture 19 the longitudinal center line of the welding rod is disposed substantially perpendicularly to the longitudinal center line of the barrel of the holder whereas if the end of the rod is received in the aperture 20 the longitudinal center line of the rod is inclined at an angle to the longitudinal center line of the holder, the two positions of the welding rod relative to the holder being particularly adapted for different welding conditions.

A stem 25 is secured at one end to the slide block 21 at the end of this block remote from the insulating plug 16 and this stem extends from the slide block toward the end of the barrel 10 remote from the insulating plug. A collar 26 is secured in the barrel 10 between the guide block 17 and the end of the barrel remote from the plug 16 and slidably receives the stem 25 intermediate the length of the latter. The slots 11 and 12 are cooling or lightening openings in the barrel and do not extend through the portion of the tube in which the collar 26 is disposed, as is clearly illustrated in Figure 3. The end of the stem 25 remote from the block 21 is screw threaded, as indicated at 27 and a nut 28 is threaded onto this end of the stem and is provided at its end remote from the stem with a bifurcated formation 29. The nut 28 is slidably received in a cylindrical bushing 30 secured in the barrel 10 adjacent the end of the latter remote from the plug 16 and collars 31 and 32 are slidably mounted on the stem 25 between the fixed collar 26 and the nut 28.

A coil compression spring 33 surrounds the stem 25 between the collars 31 and 32 and resiliently urges the stem 25 and the slide block 21 in a direction away from the insulating plug 16. The spring 33 thus resiliently urges the apertures 22 and 23 in the slide block 21 out of registry with the apertures 19 and 20 in the guide block 17 to lock the end of a welding rod between the guide block and the slide block.

A tubular coupling 35 having an inside diameter substantially equal to the outside diameter of the barrel tube 10 telescopically receives the barrel tube at the end of the latter remote from the plug 16 and is releasably secured to the barrel tube by suitable means, such as the screws 36 extending through tapped holes in the coupling and the barrel tube at angularly spaced apart locations therearound. The tubular coupling 35 is provided with a longitudinally extending slot 37 in the wall thereof and adjacent the corresponding end of the barrel tube and a hand lever 38 has a portion adjacent one end extending through the slot 37 into the tubular coupling and is pivotally connected intermediate its length to the coupling for movement about an axis transverse with respect to said coupling or a pivot pin 39 which extends through registering apertures in the coupling and the lever and is disposed adjacent the midlength location of the slot 37. The end portion of the lever 38 within the tubular coupling 35 is received in the bifurcated formation 29 on the end of the nut 28 and movement of the portion of this lever projecting outwardly of the coupling in a direction away from the plug 16 moves the stem 25 and slide block 21 in a direction toward the plug 16 against the force of spring 33 to bring the rod receiving apertures in the slide block 21 into registry with the rod receiving apertures in the guide block 17 for the insertion of a rod in the rod receiving apertures. The portion of the hand lever 38 projecting outwardly of the tubular coupling 35 is disposed at an angle to the portion of the tube disposed within the tubular connector or coupling and is provided with a covering of electrically insulative material. The end portion of the lever 38 within the tubular coupling is resiliently urged in a direction away from the nut 28 by a tension spring 40 connected between the lever and a lug 41 struck inwardly from a handle tube 42 which is disposed in longitudinal alignment with the barrel tube 10 and the coupling 35.

The handle tube 42 is telescopically received at one end in the coupling 35 at the end of the coupling remote from the barrel 10 and is preferably permanently secured in the coupling. At its end remote from the coupling the barrel is internally thickened to provide a receptacle 43 for a flexible electric conductor 44 one end of which is telescopically received in the handle tube and secured therein by the set screws 45 and 46 extending through tapped holes in the receptacle portion of the handle tube and bearing at their inner ends against the exposed electrically conductive core of the flexible conductor 44.

A handle sleeve 47 of cylindrical shape receives the handle tube 42 and extends somewhat beyond the end of the handle tube into which the conductor 44 extends to eliminate any danger of contact of the operator's hands with the corresponding end of the handle tube. The handle sleeve or grip 47 is releasably secured to the handle tube by suitable means, such as the set screw 48 extending through registering tapped holes in the handle tube and the handle sleeve and the handle sleeve has a wall thickness greater than the wall thickness of the barrel sleeve 15 and is provided in its outer surface with circumferentially extending, spaced apart grooves 49 to provide a secure hand grip.

In order to convert the electrode holder from the straight type shown in Figures 1 to 4 inclusive to the curved or pistol-grip type shown in Figure 5, a replacement unit, generally indicated at 50 and illustrated in Figure 6 is substituted for the coupling 35 and handle tube 42 of the straight type, the same barrel assembly and handle sleeve or grip being used for both arrangements.

The unit 50 comprises a longitudinally curved or angularly bent tubular coupling 51 and a handle tube 52 telescopically received at one end in one end of the coupling 51 and permanently secured to the coupling. The coupling 51 is provided with a longitudinally extending slot 53 in the concave side thereof and a hand lever 54, similar in all respects to the hand lever 38, extends at one end through the slot 53 and is pivotally connected to the coupling sleeve 51 by a pivot pin 55 which extends through registering apertures in the tubular coupling and in the hand lever and is disposed adjacent the midlength location of the slot 53.

The end of the coupling 51 remote from the handle tube 52 telescopically receives the corresponding end of the barrel 10 and is provided with spaced apart screw holes 56 for receiving the screw 36 to detachably secure the tubular coupling and handle tube to the barrel 10. The intermediate portion of the tubular coupling 51 has a covering 57 of electrically insulative material which is disposed between the adjacent ends of the insulating barrel sleeve 15 and the insulating handle sleeve or grip 47 when the device is assembled in its angularly offset condition, as illustrated in Figure 5.

A tension spring 58, corresponding in all respects to the tension spring 40, is connected between the hand lever 54 and the handle tube 52 to resiliently urge the hand lever to its inoperative position.

In order to change the electrode holder from its straight condition, as illustrated in Figures 1 to 4 inclusive, to its angularly offset or pistol-grip condition, as illustrated in Figure 5, it is necessary merely to disconnect the conductor 44 from the holder, remove the handle sleeve 47 from the handle tube 42, remove the tubular coupling 35 from the barrel tube 10, connect the tubular coupling 51 to the barrel tube 10, mount the handle sleeve 47 on the handle 52 of the unit 50 and reconnect the conductor 44 to the handle tube 52. The holder can be then restored to its straight condition by the obvious replacement of the tubular connector 35 and handle tube 42 for the connector 51 and handle tube 52.

The eye shield assembly comprises a bushing 60 of cylindrical shape which closely receives the insulating barrel sleeve 15 of the holder and is rigidly mounted on the latter near the end of the barrel sleeve remote from the insulating plug 16, the bushing being secured in position on the holder by a set screw 61 threaded through a tapped hole in the bushing and engaging the outer surface of the barrel sleeve 15 at its inner end. The bushing is provided in its peripheral surface with angularly spaced apart depressions 62 and a ring 63 of cylindrical shape closely surrounds the bushing 60 and is provided with a radially projecting boss 64 having a screw threaded bore 65 therein extending from the outer end of the boss to the inner surface of the ring.

A post 66 is externally screw threaded at one end and threaded into the bore 65 in the boss 64 so that it projects radially from the ring 63. This post has a well 67 therein opening to the end thereof threaded into the boss 64 and a detent ball 68 is disposed in the well 67 and is selectively engageable in the depression 62 in the bushing 60. A compression spring 69 is disposed in the well 67 between the ball 68 and the closed end of the well to resiliently project the ball into the depression 62 so that the ring will be releasably held in selected positions of angular adjustment relative to the bushing 60. The ring 63 is also provided with an aperture 70 through which a tool may be inserted to tighten or loosen the set screw 61.

The post 66 is also screw threaded at its end remote from the ring 63 and a block 71 has at one end a screw threaded recess receiving the screw threaded outer end of the post 66 and at its other end a partly spherical depression 72 and external screw thread 73. A bracket 74 has on one end a ball formation 75 seated in the depression 72 and an internally flanged nut 76 surrounds the ball formation 75 and is threaded onto the externally screw threaded end of the block 71 so that the block and the nut together provide a socket for the ball 75, the ball being frictionally held in selected positions of angular adjustment in this socket.

A mask 78 of frusto-pyramidal shape has at its smaller end an open ended flange or housing structure 79 of elongated, rectangular shape and filter glasses 80 are mounted in the housing structure 79 and retained therein by suitable means, such as the leaf spring 81 secured to the mask and holding the filter glasses against an internally directed flange 82 at the outer end of the housing structure 79. The bracket 74 is secured at its end remote from the ball formation 75 to one side of the housing structure 79 to support the eye shield including the mask 78 and filter glasses 80 on the outer end of the post 66.

It will be noted that the ring 63 has at one end an inwardly directed flange 84 which seats in a peripheral groove at the corresponding end of the bushing 60 and that a locking ring 85 is detachably secured to the other end of the ring 63 and seats in a corresponding peripheral groove at the adjacent end of the bushing so that the bushing 60 is locked in the ring 63 against longitudinal movement relative to the ring and it will also be noted that a lock nut 86 is threaded onto the post 66 and bears against the outer ends of the bushing 64 to firmly secure the post to the ring 63.

With the above described arrangement the eye shield is mounted on the barrel of the electrode holder at all times and is angularly adjustable around the longitudinal center line of the holder barrel and also around the universal joint between the mask of the eye shield and the outer end of its supporting post so that the shield can be moved to any position necessary for the operator to view the weld flame through the filter glasses 80 of the shield. The eye shield is of very light weight construction and the electrode holder is of relatively heavy construction so that the eye shield is easily maintained in upright position relative to the holder. Both parts are, however, of sufficient light weight as to cause no undue fatigue to an operator using the combined electrode holder and eye shield. The holder can also be easily converted between its straight condition and its pistol-grip condition to increase its convenience under different operating conditions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intended to be embraced therein.

What is claimed is:

1. In a welding electrode holder, a conductive barrel having a side wall and having open forward and rear ends, an insulating plug closing said forward end, at least one hole in said side wall rearwardly of said forward end, a guide block in said barrel rearwardly of said hole, said guide block having an axial bore and at least one hole extending transversely therethrough and registrable with the barrel hole, a slide bar slidably engaged in the bore of the guide block, said slide bar having a forward end and a rear end, said slide bar having at least one hole adjacent to its forward end which is registrable with the hole of the barrel and guide block for receiving an end of an electrode, a stem having a forward end secured to the rear end of the slide bar and a rear end, a collar fixed in and located intermediate the ends of said barrel and slidably supporting said stem, a nut secured on the rear end of the stem rearwardly of said collar, a tubular bushing having a forward end secured axially to the rear end of said barrel, said nut being slidable in said bushing, a helical spring circumposed on said stem and compressed between said collar and said nut, said spring serving to retract said stem and slide bar rearwardly in said barrel, means connecting the rear end of the barrel and the forward end of the bushing, a hand lever pivoted intermediate its ends on said means, said lever having a first portion arranged to bear freely against said nut and a second portion outside of said bushing, said bushing having a side wall provided with opening means through which the lever extends, and spring means normally retracting said first lever portion rearwardly away from said nut.

2. In a welding electrode holder, a conductive barrel having a side wall and having open forward and rear ends, an insulating plug closing said forward end, at least one hole in said side wall rearwardly of said forward end, a guide block in said barrel rearwardly of said hole, said guide block having an axial bore and at least one hole extending transversely therethrough and registrable with the barrel hole, a slide bar slidably engaged in the bore of the guide block, said slide bar having a forward end and a rear end, said slide bar having at least one hole adjacent to its forward end which is registrable with the hole of the barrel and guide block for receiving an end of an electrode, a stem having a forward end secured to the rear end of the slide bar and a rear end, a collar fixed in and located intermediate the ends of said barrel and slidably supporting said stem, a nut secured on the rear end of the stem rearwardly of said collar, a tubular bushing having a forward end secured axially to the rear end of said barrel, said nut being slidable in said bushing, a helical spring circumposed on said stem and compressed between said collar and said nut, said spring serving to retract said stem and slide bar rearwardly in said barrel, means connecting the rear end of the barrel and the forward end of the bushing, a hand lever pivoted intermediate its ends on said means, said lever having a first portion arranged to bear freely against said nut and a second portion outside of said bushing, said bushing having a side wall provided with opening means through which the lever extends, and spring means normally retracting said first lever portion rearwardly away from said nut, said means comprising a coupling, said hand lever being pivotally mounted on said coupling.

3. In a welding electrode holder, a conductive barrel having a side wall and having open forward and rear ends, an insulating plug closing said forward end, at least one hole in said side wall rearwardly of said forward end, a guide block in said barrel rearwardly of said hole, said guide block having an axial bore and at least one hole extending transversely therethrough and registrable with the barrel hole, a slide bar slidably engaged in the bore of the guide block, said slide bar having a forward end and a rear end, said slide bar having at least one hole adjacent to its forward end which is registrable with the hole of the barrel and guide block for receiving an end of an electrode, a stem having a forward end secured to the rear end of the slide bar and a rear end, a collar fixed in and located intermediate the ends of said barrel and slidably supporting said stem, a nut secured on the rear end of the stem rearwardly of said collar, a tubular bushing having a forward end secured axially to the rear end of said barrel, said nut being slidable in said bushing, a helical spring circumposed on said stem and compressed between said collar and said nut, said spring serving to retract said stem and slide bar rearwardly in said barrel, means connecting the rear end of the barrel and the forward end of the bushing, a hand lever pivoted intermediate its ends on said means, said lever having a first portion arranged to bear freely against said nut and a second portion outside of said bushing, said bushing having a side wall provided with opening means through which the lever extends, and spring means normally retracting said first lever portion rearwardly away from said nut, said means comprising a coupling, said hand lever being pivotally mounted on said coupling, said coupling having a longitudinal slot and said first lever portion having a free end slidably engaged in the slot.

References Cited in the file of this patent

UNITED STATES PATENTS

| | | |
|---|---|---|
| 1,546,739 | Le Lande | July 21, 1925 |
| 1,576,094 | Culbertson | Mar. 9, 1926 |
| 1,664,804 | Allen | Apr. 3, 1928 |
| 1,928,517 | Varner | Sept. 26, 1933 |
| 2,210,370 | Herradora | Aug. 6, 1940 |
| 2,235,594 | Smith | Mar. 18, 1941 |
| 2,390,149 | Hopper | Dec. 4, 1945 |
| 2,397,252 | Egan et al. | Mar. 26, 1946 |
| 2,398,032 | Munro et al. | Apr. 9, 1946 |
| 2,430,536 | Smith | Nov. 11, 1947 |
| 2,458,723 | Nilsson | Jan. 11, 1949 |
| 2,534,786 | McElhaney et al. | Dec. 19, 1950 |

FOREIGN PATENTS

| | | |
|---|---|---|
| 129,177 | Great Britain | July 10, 1919 |